United States Patent Office 3,429,891
Patented Feb. 25, 1969

3,429,891
CERTAIN BIS[2-(2-BENZOTHIAZOLINETHIONE-3-YL)ETHYL]SULFONE COMPOUNDS
Adel F. Halasa, Akron, Ohio, assignor to The Firestone Tire & Rubber Company, Akron, Ohio, a corporation of Ohio
No Drawing. Continuation-in-part of applications Ser. No. 473,498 and Ser. No. 473,501, both July 20, 1965. This application July 25, 1967, Ser. No. 655,754
U.S. Cl. 260—306     2 Claims
Int. Cl. C07d 91/44; C08g 17/28; C08d 13/28

ABSTRACT OF THE DISCLOSURE

Bis[2-(2-benzothiazolinethione-3-yl)ethyl] sulfone and derivatives thereof are made by reacting benzothiazoline-2-thione with divinyl sulfone and alkyl- and aryl-divinyl sulfones. The compounds are delayed-action rubber accelerators.

---

This application is a continuation-in-part of my applications Ser. No. 473,498 and Ser. No. 473,501 filed July 20, 1965, the latter case now abandoned.

This invention relates to the production of bis[2-(2-benzothiazolinethione-3-yl)ethyl] sulfone and bis[2-(2-benzothiazolinethione-3-yl)alkyl- and aryl-substituted ethyl] sulfones. They are delayed-action rubber accelerators.

The process is a Michael addition reaction between two moles of benzothiazoline-2-thione (commonly called mercaptobenzothiazole or MBT) and one mole of divinyl sulfone or derivative thereof such as represented by the following formula:

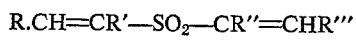

in which R, R', R" and R''' are each hydrogen or an alkyl group of 1 to 8 carbon atoms or phenyl or tolyl, and two or more of them may be the same or they may all be different. A small amount of sodium hydride is used as catalyst. The reaction products have the formula:

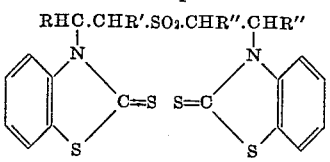

Illustrative compounds are:

Bis-[2-(2-benzothiazolinethione-3-yl)ethyl] sulfone
Bis-[2-(2-benzothiazolinethione-3-yl)2-methylethyl] sulfone
Bis-[2-(2-benzothiazolinethione-3-yl)1-ethylethyl] sulfone
Bis-[2-(2-benzothiazolinethione-3-yl)1,2-dioctylethyl] sulfone
Bis-[2-(2-benzothiazolinethione-3-yl)2-phenylethyl] sulfone
Bis-[2-(2-benzothiazolinethione-3-yl)1-tolylethyl] sulfone
Bis-[2-(2-benzothiazolinethione-3-yl)1-phenyl-2-methylethyl] sulfone One would normally expect a Michael reaction adduct of MBT to be S-substituted. Surprisingly, the adducts obtained with the sodium hydride catalysts and the divinyl sulfones are not the expected sulfur-substituted adducts, but are nitrogen-substituted adducts.

A study of the situation leads to the conclusion that the substitution on the nitrogen atom instead of the sulfur atom is due to the fact that the unstable nitrogen anion adds faster than the stable sulfur anion. The sulfur adduct in the presence of base reverses into the reactant which, in turn, produces the more stable nitrogen adduct. In other words, the unexpected preference for the N-substituted Michael adduct can be explained as a result of equilibria between the sulfur and nitrogen anions and the corresponding Michael adduct. According to these equilibria the sulfur anion of benzothiazole-2-thiol being the most stable and least energetic anion is favored in the reverse Michael reaction. The nitrogen anion being less stable and more energetic favors the forward Michael reaction; thus pulling the equilibria in that direction. The end result is the formation of the nitrogen adduct, which is the most stable end product.

The reaction is carried out in solution in an inert solvent such as anhydrous tetrahydrofuran or ethanol, etc., using a catalytic amount of sodium hydride. Any usual temperature is employed which may be below room temperature, but will ordinarily be somewhat above room temperature.

The following example is illustrative:

Example.—Bis-[2-(2-benzothiazolinethione-3-yl)-ethyl]sulfone

Reactants used:

| | |
|---|---|
| Divinyl sulfone (0.1 mole+10%) _____ g__ | 11.8 |
| Benzothiazoline-2-thione (0.1 mole) _____ g__ | 16.7 |
| NaH (50% suspension in oil) _____ g__ | 0.1 |
| Tetrahydrofuran _____ ml__ | 200 |

A 1-liter, 3-necked flask was used, equipped with a thermometer, dropping funnel and stirrer. The MBT was dissolved in the tetrahydrofuran and added to the flask. The sodium hydride as a catalyst was dissolved in this. The divinyl sulfone was then added through the dropping funnel while the solution was kept at 0 to 5° C. The dropping funnel was then replaced by a reflux condenser and the solution was refluxed for 48 hours. The tetrahydrofuran was evaporated and the product recrystallized from chloroform and petroleum ether. On recrystallization, the product melted at 204–207° C. It was identified by its elemental analysis as well as by its infrared spectrum.

Analysis.—Calcd. for $C_{18}C_{16}N_2O_2S_5$: C, 47.76; H, 3.56; N, 6.19; S, 35.42. Found: C, 47.63; H, 3.56; N, 5.97; S, 34.62

The compound has the formula

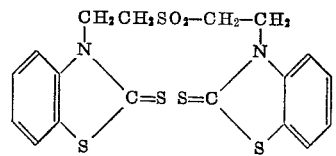

I claim:
1. A compound of the formula

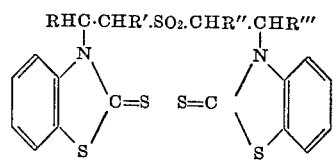

in which R, R', R", and R''' are each from the group consisting of hydrogen, alkyl groups of 1 to 8 carbon atoms, phenyl and tolyl.

2. A compound of claim 1, namely, bis[2-(2-benzothiazolinethione-3-yl)ethyl] sulfone.

References Cited

Kulka et al.: Can. J. Chem., vol. 35, pp. 519–526 (1957).

ALTON D. ROLLINS, Primary Examiner.

U.S. Cl. X.R.

260—607, 788

UNITED STATES PATENT OFFICE
CERTIFICATE OF CORRECTION

Patent No. 3,429,891            February 25, 1969

Adel F. Halasa

It is certified that error appears in the above identified patent and that said Letters Patent are hereby corrected as shown below:

Column 1, line 42, the first line of the formula should appear as shown below:

$$R\underset{|}{H}C.CHR'.SO_2.CHR''.\underset{|}{C}HR'''$$

Signed and sealed this 31st day of March 1970.

(SEAL)
Attest:

Edward M. Fletcher, Jr.            WILLIAM E. SCHUYLER, JR.
Attesting Officer            Commissioner of Patents